US012544742B1

(12) United States Patent
Tahir et al.

(10) Patent No.: US 12,544,742 B1
(45) Date of Patent: Feb. 10, 2026

(54) SULFURIZED PEROVSKITE NANOSHEETS, SYNTHESIS AND USES THEREOF

(71) Applicant: United Arab Emirates University, Al Ain (AE)

(72) Inventors: Muhammad Tahir, Al Ain (AE); Yahia Alanizan, Al Ain (AE)

(73) Assignee: UNITED ARAB EMIRATES UNIVERSITY, Al-Ain (AE)

(*) Notice: Subject to any disclaimer, the term of this patent is extended or adjusted under 35 U.S.C. 154(b) by 0 days.

(21) Appl. No.: 19/229,190

(22) Filed: Jun. 5, 2025

(51) Int. Cl.

| | |
|---|---|
| ***B01J 27/043*** | (2006.01) |
| ***B01J 35/39*** | (2024.01) |
| ***B01J 35/45*** | (2024.01) |
| ***B01J 35/54*** | (2024.01) |
| ***B01J 35/70*** | (2024.01) |
| ***B01J 37/02*** | (2006.01) |
| ***B01J 37/03*** | (2006.01) |
| ***B01J 37/04*** | (2006.01) |
| ***B01J 37/08*** | (2006.01) |
| ***B01J 37/20*** | (2006.01) |
| ***C01B 3/04*** | (2006.01) |
| ***C01G 51/15*** | (2025.01) |

(52) U.S. Cl.
CPC ............ *B01J 27/043* (2013.01); *B01J 35/39* (2024.01); *B01J 35/45* (2024.01); *B01J 35/54* (2024.01); *B01J 35/733* (2024.01); *B01J 37/0236* (2013.01); *B01J 37/031* (2013.01); *B01J 37/04* (2013.01); *B01J 37/088* (2013.01); *B01J 37/20* (2013.01); *C01B 3/042* (2013.01); *C01G 51/15* (2025.01); *C01P 2002/34* (2013.01); *C01P 2002/50* (2013.01); *C01P 2002/72* (2013.01); *C01P 2002/82* (2013.01); *C01P 2002/84* (2013.01); *C01P 2002/85* (2013.01); *C01P 2004/03* (2013.01); *C01P 2004/24* (2013.01)

(58) Field of Classification Search
CPC . B01J 27/043; B01J 35/45; B01J 35/54; B01J 35/733; B01J 35/39; B01J 37/0236; B01J 37/04; B01J 37/088; B01J 37/20; C01G 51/15; C01B 3/042
See application file for complete search history.

(56) References Cited

FOREIGN PATENT DOCUMENTS

CN 112675881 A * 4/2021

* cited by examiner

*Primary Examiner* — James A Fiorito
(74) *Attorney, Agent, or Firm* — MH2 Technology Law Group, LLP

(57) ABSTRACT

The present invention relates to the field of renewable energy and photocatalysis (e.g. photocatalytic water splitting for hydrogen production), specifically focusing on sulfurized perovskite compounds, perovskite nanosheets, and synthesis method and uses thereof. The present invention relates to perovskite nanosheets comprising $LaXO_nS_{3-n}$, wherein X is a metal selected from Fe, Co, Mn, Cu, Zn, or Ni; and wherein $0<n<3$. Further, the present invention explores the perovskite nanosheets to improve efficiency, stability, and light absorption in solar-driven hydrogen generation applications. The present perovskite nanosheet enhances visible light absorption, charge carrier mobility, and catalytic activity, making it useful for large-scale hydrogen production.

19 Claims, 5 Drawing Sheets

SULFURIZED PEROVSKITE NANOSHEETS, SYNTHESIS AND USES THEREOF

FIELD OF THE INVENTION

The present invention relates to the field of perovskites, specifically sulfurized perovskite nanosheets and a method of manufacturing a perovskite nanosheet. The present invention also relates to applications such as renewable energy and photocatalysis, specifically focusing on photocatalytic water splitting for hydrogen production. Further, the present invention explores such perovskite nanosheets as advanced photocatalysts to enhance efficiency, stability, and visible light absorption in solar-driven hydrogen generation applications.

BACKGROUND OF THE INVENTION

The information in this section merely provides background information that will be useful in understanding the present disclosure and may not constitute prior art(s) for the present disclosure.

The global demand for sustainable energy sources continues to evolve to mitigate the adverse consequences of fossil fuel dependence, particularly concerning environmental impacts. Fossil fuels significantly contribute to climate change and global warming by releasing greenhouse gases (GHGs), worsening the climate crisis. Additionally, the energy industry faces growing challenges due to geopolitical fluctuations, rising energy demands, and stringent environmental regulations aimed at reducing reliance on fossil fuels. Energy exists in various forms all around us, but efficient, clean, and renewable harvesting methods remain a focal point of research and innovation. Similar to fossil fuels, energy carriers with high energy densities, such as hydrogen, ammonia, and methanol, offer promising alternatives for sustainable energy solutions. The urgency to diversify and restructure the path toward clean energy has driven researchers and organizations to find resolutions, resulting in increased research on renewable energy technologies and their practical implementation.

Among the various renewable energy sources, solar energy stands out as a clean, abundant, and renewable option gaining significant attention. However, like many renewable sources, solar energy faces challenges related to efficiency and storage. Photocatalysis has emerged as a favorable method for utilizing solar energy. This process involves harvesting light to catalyze a reaction by lowering its activation energy, thereby reducing the energy required to drive the reaction. The availability of water and sunlight as reactants and energy sources, respectively, provides a strong foundation for research focused on developing advanced photocatalysts for efficient water splitting into hydrogen and oxygen.

Hydrogen ($H_2$) is a highly energy-dense molecule and a potential clean energy carrier. However, existing water-splitting photocatalysts lack the necessary efficiency, stability, and scalability for industrial applications due to their relatively insufficient performance, lack of stability, and current technological limitations of photocatalytic reactors. One class of materials that has shown ability in this regard is perovskite oxides.

Perovskite oxides are among the notable semiconductors used in photocatalytic water splitting. Particularly, $ABO_3$ perovskites possess suitable properties for photocatalytic water splitting, such as adjustable light absorption capabilities (by modifying the A and B sites), tunable band gaps, optimized charge carrier mobility, and synergistic effects within composite materials. However, these materials still face limitations in terms of efficiency and stability. To enhance the photocatalytic performance of perovskites, researchers have explored the substitution of oxygen with elements such as nitrogen, sulfur, and halogens (Cl, I, Br). These substitutions lead to perovskite nitrides, sulfides, and halides, respectively, each exhibiting unique chemical and electronic properties due to variations in electronegativity and structural influences.

For example, a previous publication demonstrated that partial sulfurization of $Sm_2Ti_2O_7$ to $Sm_2Ti_2S_2O_5$ shifted the light absorption spectrum by 250 nm toward the visible region due to sulfur's higher electronegativity altering the valence band edges. Similarly, studies on the sulfurization of $Sn_2Nb_2O_7$ to $Sn_2Nb_2O_{7-x}S_x$ revealed enhanced visible light absorption up to 600 nm, leading to increased hydrogen and oxygen evolution rates in photocatalytic water splitting. These sulfurized materials may still suffer from suboptimal charge separation, low carrier mobility, and structural instability under reaction conditions.

Another publication investigated the partially sulfurized perovskite MnInOs and observed an improved hydrogen evolution rate and higher stability compared to $InMnO_3$ and $MnIn_2S_4$. The introduction of sulfur with optimum composition to $InMnO_3$ revealed more active sites, provided narrower band gap suitable for photocatalytic water splitting, and increased visible light absorption capability. However, precise control over sulfur incorporation is challenging and may lead to inconsistencies in band structure, active site distribution, and overall catalytic performance.

In summary, despite the growing interest in hydrogen as a clean and high-energy-density fuel, the widespread adoption of photocatalytic water splitting technologies remains limited by several key challenges. Many existing photocatalysts exhibit low solar-to-hydrogen (STH) conversion efficiency due to their inability to effectively absorb visible light, often resulting from wide band gaps. Additionally, high rates of charge carrier recombination and poor charge mobility reduce the overall photocatalytic activity. The structural and chemical instability of many materials under aqueous or neutral pH conditions further impairs long-term performance and durability. Moreover, the dependence on expensive noble metals such as platinum or ruthenium for catalytic enhancement significantly increases costs and hinders large-scale commercialization.

In view of the above challenges, there is a need to provide catalytic material that exhibits enhanced photocatalytic water splitting, photocatalytic efficiency and stability to serve as efficient materials for solar-driven water splitting applications. The present disclosure is directed to overcome one or more limitations stated above or any other limitations associated with the known arts.

SUMMARY OF THE INVENTION

This summary is intended to introduce, in simplified form, a selection of concepts that are further described in the detailed description. This summary is merely presented as a brief overview of the subject matter described and claimed herein and does not aid in determining the scope of the claimed subject matter.

According to a first aspect of the disclosure, provided herein is a perovskite nanosheet comprising a compound of Formula (I):

$$LaXO_nS_{3-n} \quad (I)$$

wherein X is a metal selected from Fe, Co, Mn, Cu, Zn, or Ni; and wherein $0<n<3$.

The present inventors have surprisingly discovered that the compound of Formula (I) obtains good light absorption intensity and spectrum across the UV region and visible light region. It exhibits good charge transfer and mobility characteristics due to low resistance of the charge movement which is good for photocatalytic applications. It can perform oxidation and reduction reactions in a neutral pH medium within a potential difference due to its catalytic ability of generating a good quantity of charge as holes and electron, generating a current.

According to a second aspect of the disclosure, provided herein is method for manufacturing a perovskite nanosheet comprising a compound of Formula (I):

$$LaXO_nS_{3-n} \quad (I)$$

wherein X is a metal selected from Fe, Co, Mn, Cu, Zn, or Ni; and wherein $0<n<3$.

The method comprises the step of obtaining a precursor, wherein the precursor is a compound of Formula (II):

$$LaXO_3 \quad (II)$$

wherein X is a metal selected from Fe, Co, Mn, Cu, Zn, or Ni.

The method further comprises the step of synthesizing the perovskite nanosheet from the precursor using a hydrothermal sulfurization method.

BRIEF DESCRIPTION OF DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF THE INVENTION

Figure 1:
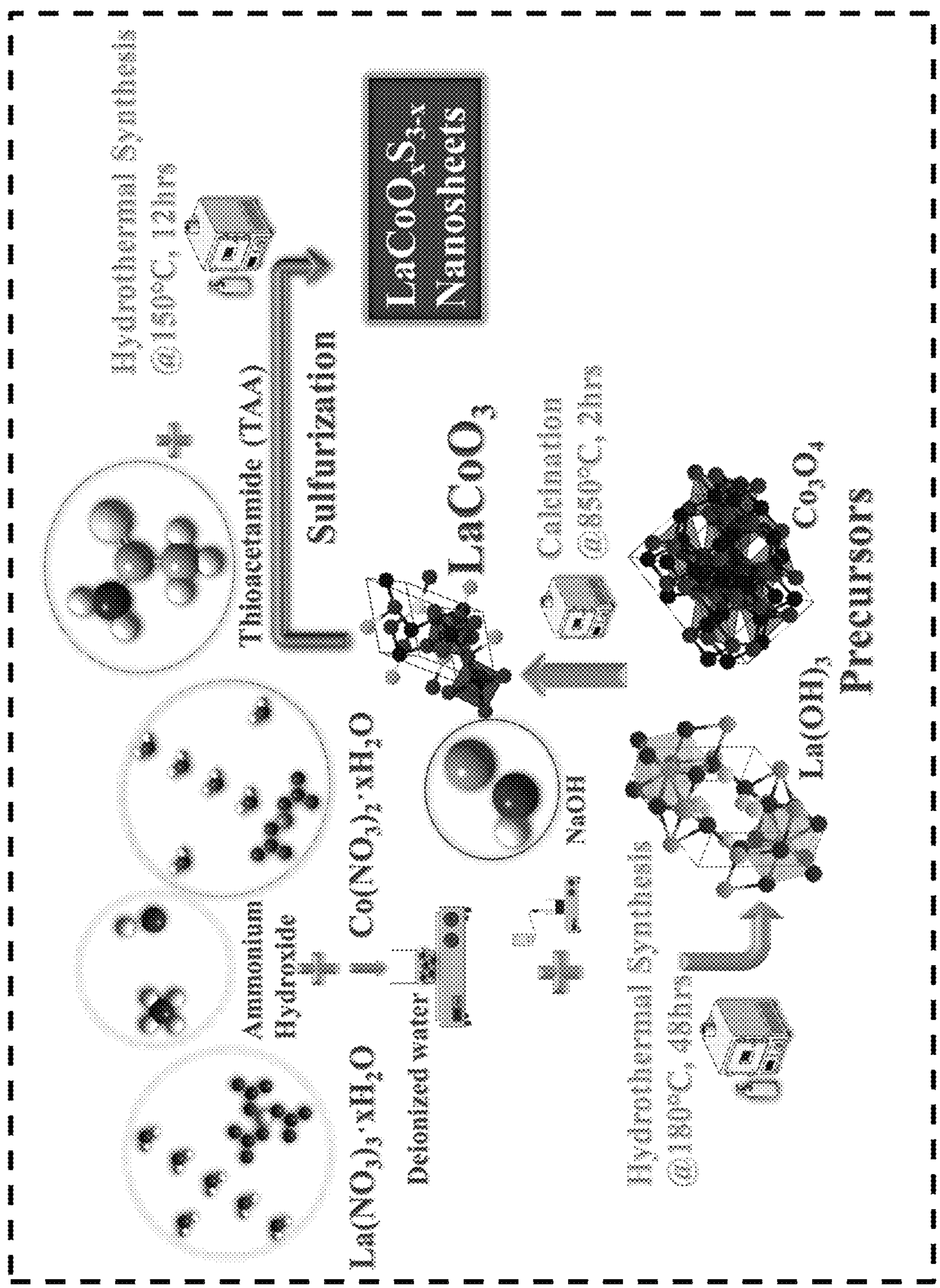
FIG. 1: illustrates the synthesis of $LaCoO_nS_{3-n}$, in accordance with an embodiment of the present invention.

At the very outset of the detailed description, it may be understood that the ensuing description only illustrates a particular form of this invention. However, such a particular form is only an exemplary embodiment, and without intending to imply any limitation on the scope of this invention. Accordingly, the description is to be understood as an exemplary embodiment and teaching of invention and not intended to be taken restrictively.

It is also to be understood that the terminology used herein is for the purpose of describing particular embodiments only and is not intended to limit the present invention.

Where a ranging from values is provided, it is understood that each intervening value, to the tenth of the unit of the lower limit unless the context clearly dictates otherwise, between the upper and lower limit of that range and any other stated or intervening value in that stated range, is encompassed within the method. The upper and lower limits of these smaller ranges may independently be included in the smaller ranges and are also encompassed within the method, subject to any specifically excluded limit in the stated range. Where the stated range includes one or both of the limits, ranges excluding either or both of those included limits are also included in the method.

Unless defined otherwise, all technical and scientific terms used herein have the same meaning as commonly understood by those of ordinary skill in the art to which the invention belongs. Although any catalytic compound and preparation method similar or equivalent to those described herein can be used in the practice or testing of the present invention, preferred catalytic compound and preparation method are described. For the purposes of the present invention, the following terms are defined below.

The articles "a" and "an" are used herein to refer to one or to more than one (i.e. to at least one) of the grammatical object of the article. By way of example, "an element" means one element or more than one element.

The term "catalytic compound" or "compound" or "lanthanum cobalt oxysulfide perovskite" are interchangeably used in the present invention.

As used herein, the term "comprises" or "comprising" is generally used in the sense of include, that is to say permitting the presence of one or more features or components.

Each embodiment is provided by way of explanation of the invention and not by way of limitation of the invention. In fact, it will be apparent to those skilled in the art that various modifications and variations can be made to the catalytic compounds and methods described herein without departing from the scope or spirit of the invention. For instance, features illustrated or described as part of one embodiment can be applied to another embodiment to yield a still further embodiment. Thus, it is intended that the present invention includes such modifications and variations and their equivalents. Other objects, features and aspects of the present invention are disclosed in or are obvious from, the following detailed description. It is to be understood by one of ordinary skill in the art that the present discussion is a description of exemplary embodiments only and is not to be construed as limiting the broader aspects of the present invention.

According to a first aspect of the disclosure, provided herein is a perovskite nanosheet comprising a compound of Formula (I):

$$LaXO_nS_{3-n} \quad (I)$$

wherein X is a metal selected from Fe, Co, Mn, Cu, Zn, or Ni; and wherein $0<n<3$.

In some embodiments, the metal is Cobalt (Co). For example, the compound may be $LaCoOS_2$ or $LaCoO_2S$ or $LaCoO_{2.5}S_{0.5}$.

In some embodiments, the perovskite nanosheet is a two-dimensional (2D) nanosheet. The perovskite nanosheet is a two-dimensional (2D) nanosheet comprising more than one crystalline phase. For example, two-dimensional (2D) nanosheet may comprise a cubic and/or hexagonal crystalline phase. In preferred embodiments, the two-dimensional (2D) nanosheet comprises a cubic and hexagonal crystalline phase. In some embodiments, the perovskite nanosheet has a morphology of uniform size and shape.

In some embodiments, the compound has a band gap of between about 2.2 eV to 3.0 eV, for example about 2.62 eV. In another embodiment, the compound has a conduction band of between about −2.0 eV to −0.2 eV, for example about −0.81 eV. In another embodiment, the compound has a valence band of between about 1.0 eV to 2.0 eV, for example about 1.81 eV.

In another embodiment, the compound comprises Lanthanum, metal X, Oxygen, and Sulphur in a ratio of [1:1:n:3-n] wherein n is $0<x<3$. For example, the ratio of the compound may be about 1:1:2.5:0.5.

In another embodiment, the compound performs oxidation and reduction reactions in a neutral pH medium. In another embodiment, the compound is configured for performing water splitting under visible light irradiation and generating green hydrogen.

In another embodiment, the compound has good charge transfer and mobility characteristics. In another embodiment, the compound is useful for solar cells, green hydrogen production, solar fuel solar cells, green hydrogen production, transistors, sensors, capacitors, batteries, water treatment, and pollution degradation. In another embodiment, the compound has various applications due to its tunability of properties, such as like catalytic, electronic, and optoelectronic.

In another embodiment, the compound is a photocatalytic compound and is in the form of nanosheets. In another embodiment, the compound is in the form of nanosheets.

In another embodiment, the present invention provides a catalytic compound $LaXO_nS_{3-n}$ wherein X is Co.

According to a second aspect of the disclosure, provided herein is method for manufacturing a perovskite nanosheet comprising a compound of Formula (I):

$$LaXO_nS_{3-n} \quad \text{(I)}$$

wherein X is a metal selected from Fe, Co, Mn, Cu, Zn, or Ni; and wherein $0<n<3$.

The method comprises the step of obtaining a precursor, wherein the precursor is a compound of Formula (II):

$$LaXO_3 \quad \text{(II)}$$

wherein X is a metal selected from Fe, Co, Mn, Cu, Zn, or Ni.

In some embodiments, the step of obtaining the precursor comprises synthesizing the precursor using a hydrothermal synthesis method from reactants comprising a lanthanum source and a metal source, wherein the metal is selected from Fe, Co, Mn, Cu, Zn, or Ni. For example, the metal source may be a cobalt source.

In some embodiments, the lanthanum source comprises lanthanum nitrate hexahydrate. In some embodiments, the metal source comprises metal nitrate hexahydrate.

In some embodiments, the hydrothermal synthesis method comprises the steps of: mixing together a complexing agent, the lanthanum source and the metal source in water to obtain a first mixture; preparing a strong base solution and adding it to the first mixture to obtain a second mixture; and heating, cooling and drying the second mixture, followed by calcination to obtain the precursor In some embodiments, the complexing agent is ammonium hydroxide. In some embodiments, the strong base solution comprises sodium hydroxide or potassium hydroxide.

In some embodiments, an equimolar amount of the lanthanum source and the metal source is added. For example, an equimolar amount of lanthanum and metal are present in the reagents.

In some embodiments, the heating is carried out at a temperature of 100° C. to 250° C. for 12 hours to 96 hours, preferably at a temperature of 180° C. for 48 hours. In some embodiments, the calcination is carried out at a temperature of 750° C. to 950° C. for 1 hour to 6 hours, preferably at a temperature of 850° C. for 2 hours.

In some embodiments, the perovskite nanosheet is synthesized from reactants comprising the precursor and a sulfur source. In some embodiments, the sulfur source comprises thioacetamide (TAA). Preferably, the sulfur source is thioacetamide (TAA).

In some embodiments, the hydrothermal sulfurization method comprises the steps of: mixing the sulfur source and the precursor to obtain a third mixture; and heating, cooling, drying the third mixture to obtain the perovskite nanosheet.

In some embodiments, the molar ratio of the sulfur source and the precursor is about 0.5 to 10:0.5 to 2, preferably about 0.5 to 3:0.5 to 1.5.

The present invention provides a method for preparing a catalytic compound $LaXO_nS_{3-n}$ wherein X is a metal selected from Fe, Co, Mn, Cu, Zn, or Ni; and comprising the following steps of:

a) adding a weak base to water to obtain a solution;
b) adding lanthanum nitrate hexahydrate and metal nitrate hexahydrate into the solution of step (a) to obtain a first mixture;
c) preparing a strong base solution followed by adding it into the first mixture;
d) heating, cooling, drying the first mixture, followed by calcination to obtain a powder of $LaXO_3$;
e) mixing thioacetamide (TAA) with the powder of $LaXO_3$ to obtain a second mixture; and
f) heating, cooling, drying the second mixture of step (e) to obtain the catalytic compound.

In another embodiment, the weak base is ammonium hydroxide.

In another embodiment, the metal nitrate hexahydrate includes the metal selected from La, Fe, Co, Mn, Cu, Zn, or Ni. In a specific embodiment, the metal is Co.

In another embodiment, the strong base solution is selected from sodium hydroxide, or potassium hydroxide. In a specific embodiment, the strong base is sodium hydroxide.

In another embodiment, the first mixture is heated at a temperature of 100° C. to 250° C. for 12 hours to 96 hours. In another embodiment, the heating temperature is 150° C., 160° C., 170° C., 180° C., 190° C., 200° C., or 210° C. In a specific embodiment, the first mixture is heated at a temperature of 180° C. for 48 hours.

In another embodiment, in step (d), the first mixture is calcinated at a temperature of 750° C. to 950° C. for 1 hour to 6 hours. In another embodiment, the calcination temperature is 750° C., 800° C., 850° C., 900° C., or 950° C. for 1 hour, 2 hours, 3 hours, 4 hours, 5 hours, or 6 hours. In a specific embodiment, the first mixture is calcinated at a temperature of 850° C. for 2 hours. In another embodiment, wherein in step (e), the molar ratio of TAA and $LaXO_3$ is 0.5:0.5 to 10:2, preferably the ratio is 1.5:1.0. In another embodiment, the molar ratio of TAA and $LaXO_3$ is 1.5:1.0.

In another embodiment, in step (f), the second mixture is heated at a temperature of 120° C. to 180° C. for 8 hours to 16 hours. In another embodiment, the second mixture is heated at a temperature of 120° C., 130° C., 140° C., 150° C., 160° C., 170° C., or 180° C. for 8 hours, 9 hours, 10 hours, 11 hours, 12 hours, 13 hours, 14 hours, 15 hours, or 16 hours. In a specific embodiment, the second mixture is heated at a temperature of 150° C. for 12 hours.

In another embodiment, the present invention provides a method for preparing a catalytic compound $LaXO_nS_{3-n}$ wherein X is Co, and comprising the following steps of:

a) adding ammonium hydroxide to water to obtain a solution;
b) adding lanthanum nitrate hexahydrate and cobalt nitrate hexahydrate into the solution of step (a) to obtain a first mixture;
c) preparing a sodium hydroxide solution followed by adding it into the first mixture;
d) heating, cooling, drying the first mixture, followed by calcination to obtain a powder of $LaXO_3$;
e) mixing thioacetamide (TAA) with the powder of $LaXO_3$ to obtain a second mixture; and
f) heating, cooling, drying the second mixture of step (e) to obtain the catalytic compound; wherein
   the first mixture is heated at a temperature of 150° C. to 210° C. for 24 hours to 72 hours and calcinated at a temperature of 750° C. to 950° C. for 1 hour to 6 hours; and
   the second mixture is heated at a temperature of 120° C. to 180° C. for 8 hours to 16 hours.

In another embodiment, the present invention provides a method for preparing a catalytic compound of formula (I): $LaXO_nS_{3-n}$(formula I)

wherein X is Co, and wherein 0<n<3.

comprising the following steps of:

a) adding ammonium hydroxide to water to obtain a solution;
b) adding lanthanum nitrate hexahydrate and cobalt nitrate hexahydrate into the solution of step (a) to obtain a first mixture;
c) preparing a sodium hydroxide solution followed by adding it into the first mixture;
d) heating, cooling, drying the first mixture, followed by calcination to obtain a powder of $LaXO_3$;
e) mixing thioacetamide (TAA) with the powder of $LaXO_3$ to obtain a second mixture; and
f) heating, cooling, drying the second mixture of step (e) to obtain the catalytic compound; wherein
   the first mixture is heated at a temperature of 180° C. for 48 hours and calcinated at a temperature of 850° C. for 2 hours;
   the second mixture is heated at a temperature of 150° C. for 12 hours.

In an embodiment, the present invention provides a solar cell comprising the catalytic compound as claimed in claim 1.

The lanthanum cobalt oxysulfide perovskite ($LaCoO_nS_{3-n}$) of the present invention attains photocatalytic and energy storage capabilities. Such capabilities are valuable in several applications like converting solar energy to chemical energy, clean energy, and electrical energy, degrading pollutants and cleaning water, converting harmful and toxic chemicals to valuable and environmentally friendly materials, producing batteries with high safety and energy density in comparison with currently industrialized batteries, and other electronic and optical devices like sensors and transistors.

$LaCoO_nS_{3-n}$ acquires nanosheet morphology implying high surface area, shows good charge mobility, lower charge resistance, good catalytic activity and more charge generation, high intensity and a broader spectrum of UV and visible light absorption, and narrow band gap.

$LaCoO_nS_{3-n}$ attains suitable ranges of band gap, conduction band, and valence band for photocatalytic water splitting, resulting in green hydrogen production under visible light irradiation.

$LaCoO_nS_{3-n}$ has the flexibility to be coupled with many materials to meet further desired requirements for varying applications resulting in boosted synergistic effects.

While addressing the limitations of conventional water-splitting materials, the present invention incorporates sulfur substitutions in perovskite oxides to enhance visible light absorption, charge carrier mobility, and catalytic activity. Experimental studies provided indicate that such incorporation of sulfur narrows the band gap, increases active sites, and improves photocatalytic efficiency, making these materials favorable for large-scale hydrogen production.

Abbreviations

TAA: Thioacetamide
NMP: N-Methyl-2-pyrrolidone
EIS: Electrochemical impedance spectroscopy
FTO: Fluorine-doped tin oxide
BG: Band Gap
VB: Valance band
CB: Conduction band
CV: Cyclic voltammetry
PL: Photoluminescence
XRD: X-ray Diffraction
SEM: Scanning electron microscopy
EDX: Energy Dispersive X-ray
FTIR: Fourier Transform Infrared Spectroscopy
GC: Gas chromatography
UV-vis: Ultraviolet visible spectroscopy
PL: Photoluminescence
Eq: Equation
mins: minutes
hrs: hours
° C.: Degree Celsius

Examples

The following examples are given by way of illustration of the working of the invention in actual practice and therefore should not be construed to limit the scope of present invention.

Chemicals: In the synthesis procedure, the following chemicals were used:

Lanthanum nitrate hexahydrate (99.9%, Sigma-Aldrich) and Cobalt nitrate hexahydrate (98%, Sigma-Aldrich) as precursors of Lanthanum and Cobalt;

Ammonia solution (NH4OH 25%, SRL) as a complexing agent;

Sodium Hydroxide pellets (NaOH, Supelco) used to raise pH and to conduct precipitation;

Thioacetamide (TAA, 99%, Sigma-Aldrich) as sulfur source;

Methanol (99.7%, Honeywell), was used as a sacrificial agent; and deionized water as a solvent medium for hydrothermal synthesis and as a reactant.

Synthesis procedure of $LaCoO_nS_{3-n}$ perovskite oxysulfide: The synthesis of $LaCoO_nS_{3-n}$ is done via 2 steps method: first is the synthesis of $LaCoO_3$ by hydrothermal method, and second is the sulfurization of the obtained $LaCoO_3$ by hydrothermal method as illustrated in FIG. 1. $LaCoO_3$ is synthesized by adding 1.47 mL of Ammonia solution ($NH_4OH$, 25%, weak base) to 40 mL of deionized water in a beaker and stirring magnetically for a few minutes. Then add equimolar amounts (0.002 mol: 0.002 mol) of Lanthanum nitrate hexahydrate (0.86 g) and cobalt nitrate hexahydrate (0.58 g) to the diluted ammonia-solution prepared earlier to prepare the first mixture and stir for 30 min. A solution of NaOH (strong base) in deionized water shall be prepared and then added slowly within a duration of ~30 mins to the first mixture until pH reaches ~12.5, then stir for ~2 hrs. The mixture is then added to a Teflon liner stainless steel auto-clave reactor and introduced to a muffle furnace at 180° C. for 48 hours. The reactor is then cooled slowly to room temperature to emphasize better crystallinity. The product is then diluted and washed until it reaches a pH of ~7, then added to a drying oven at 80° C. overnight. The product is then milled, added to a crucible and calcined in a muffle furnace at 850° C. for 2 hours and cooled slowly back to room temperature, then $LaCoO_3$ powder is obtained.

To synthesize $LaCoO_nS_{3-n}$, a 1.5:1.0 molar ratio of TAA: $LaCoO_3$ were mixed to prepare a second mixture by a magnetic stirrer in a beaker of 40 mL deionized water and added to a Teflon liner stainless steel autoclave, the autoclave was then introduced to a muffle furnace for 12 hrs at 150° C. After the reactor was cooled, it was opened in a fume hood, filtered and washed 3 times with deionized water via a centrifuge, and then dried in a drying oven overnight at 80° C.

Characterization: Several characterization techniques were conducted to evaluate samples and ensure successful synthesis. Structural crystallinity was investigated by X-ray Diffraction (XRD) with Cu Kα 1.5406 radiation. Scanning electron microscopy (SEM) was used to reveal the morphological structure, and Energy Dispersive X-ray (EDX) to conduct elemental mapping. UV and visible light absorption intensity, spectrum, as well as band gap were investigated and calculated using UV-3600 Plus spectroscopy. Photoluminescence (PL) spectroscopy was utilized to study charge separation capabilities with a 532 nm laser. Functional groups were identified using Fourier Transform Infrared Spectroscopy (FTIR).

Photocatalytic performance measurement: To assist photocatalytic activity, hydrogen production tests were implemented. The setup consisted of an immersion-type quartz photochemical reactor with 150 mL solution capacity, 95% deionized water, and 5% sacrificial agent, with 0.1 g catalyst loading. A light source of 35 W Xenon lamp of 4300K operating at 3.5 A current, was immersed in the system. The reactor consists of a single inlet and single outlet; the inlet valve pumps nitrogen, and the outlet valve is attached to a gas sampling bag with a 1 L capacity that is replaced every 60 minutes. Gas collected is then injected into a gas chromatography (GC) to obtain qualitative and quantitative analysis.

Electrochemical measurement: Electrochemical evaluations were conducted at three electrode cells with Sample (on FTO glass), Ag/AgCl, platinum mesh, and 0.2M $Na_2SO_4$, as working electrode, reference electrode, Counter electrode, and electrolyte, respectively, via Corrtest, CS350M in COM4 workstation. FTO glass samples were prepared by adding together 100 mg of the sample, 15 mg super-P Carbon, 5 mg Polyvinylidene fluoride, and N-Methyl-2-pyrrolidone (NMP) to form a slurry then coated on FTO glass with an area of (1.2 cm×2.4 cm). Electrochemical impedance spectroscopy (EIS) evaluations were conducted at 150 mL solution of 0.2M $Na_2SO_4$ within a frequency range of 100 kHz and 0.01 Hz, with zero voltage.

Figure 2:
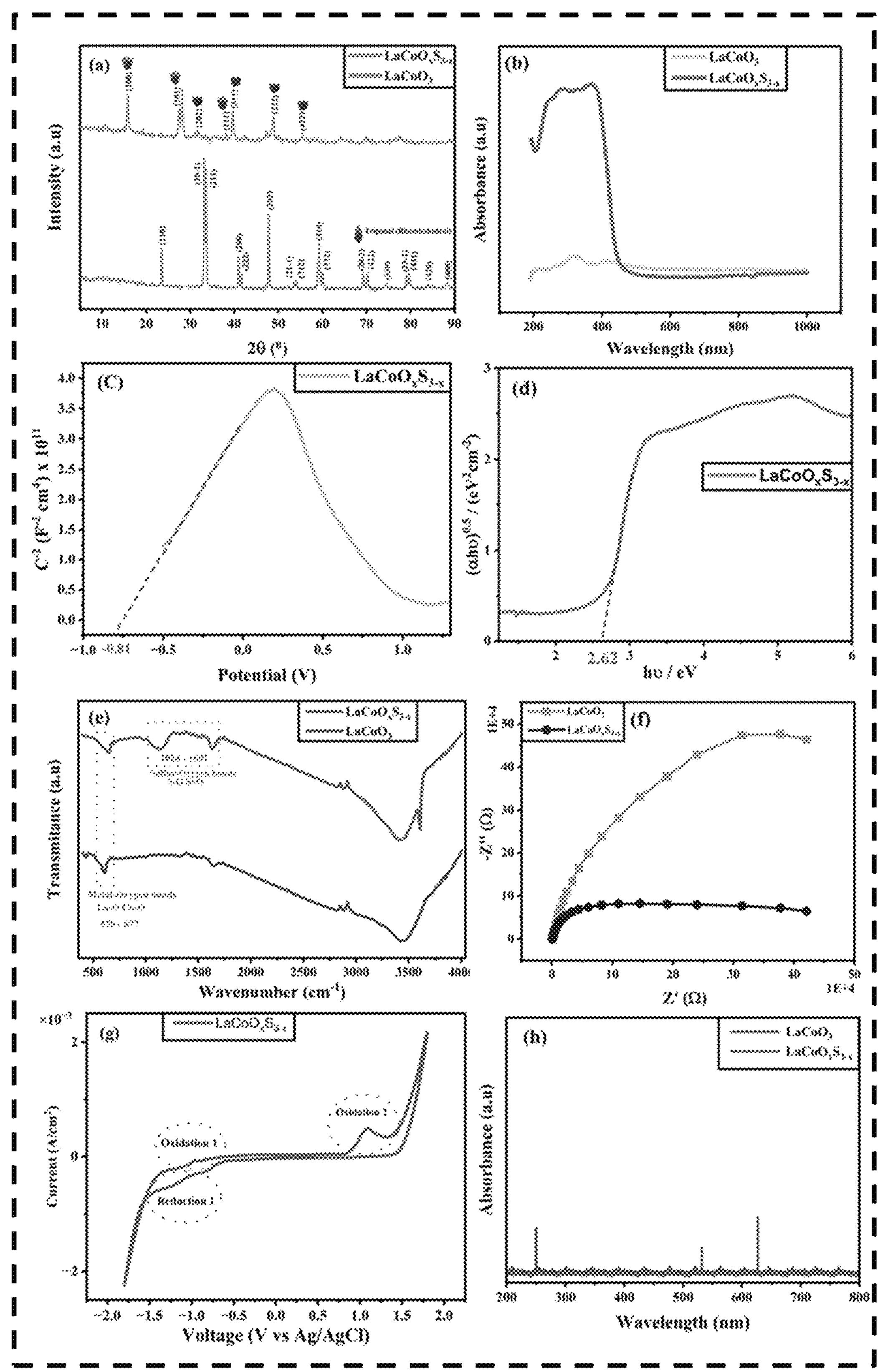
FIG. 2: illustrates a) XRD evaluation plot of $LaCoO_3$ & $LaCoO_nS_{3-n}$. b) UV-vis analysis of $LaCoO_3$ & $LaCoO_nS_{3-n}$. c) Mott-Schottky curve of $LaCoO_nS_{3-n}LaCoO_nS_{3-n}$. d) Tauc plot of $LaCoO_nS_{3-n}$. e) FTIR analysis of $LaCoO_3$ & $LaCoO_nS_{3-n}$. f) EIS analysis of $LaCoO_3$ & $LaCoO_nS_{3-n}$. g) Cyclic voltammetry analysis of $LaCoO_3$ & $LaCoO_nS_{3-n}$. h) PL analysis of $LaCoO_3$ & $LaCoO_nS_{3-n}$, in accordance with an embodiment of the present invention.

Results—Material Characterization:

XRD: FIG. 2(*a*) shows the plotted XRD data of $LaCoO_3$ and $LaCoO_nS_{3-n}$. Trigonal (Rhombohedral) $LaCoO_3$ was successfully synthesized with 2θ values of 23.54°, 33.19°, 33.65°, 41.00°, 41.65°, 47.80, 53.500, 54.140, 59.290, 60.12°, 69.220, 70.230, 74.55° 79.05°, 79.70°, 83.92°, and 88.34°, respectively associated with (110), (10-1), (211), (200), (222), (202), (21-1), (312), (310), (332), (20-2), (422), (330), (23-1), (431), (420) and (400) crystal planes.

Upon sulfurization, $LaCoO_nS_{3-n}$ exhibited a change in its crystal structure as per the XRD data. Peaks of new $LaCoO_nS_{3-n}$ material interestingly match $LaCoO_3$ precursor peaks. $LaCoO_3$ precursor is obtained after hydrothermal synthesis, and prior to calcination. Moreover, sulfurization altered the crystal system from Trigonal ($LaCoO_3$) to coexistence of dual phases of Cubic and hexagonal ($LaCoO_nS_{3-n}$). Peaks detected at 2θ values of 15.91°, 27.49°, and 38.15°, are respectively associated with (100), (101), and (111) crystal planes of hexagonal system (JCPDS No. 36-1481). In addition, 2θ values at 31.72°, 39.71°, 48.87°, and 55.43°, are respectively associated with (202), (311), (222), and (422) crystal planes of the cubic system (JCPDS No. 00-042-1467). The sulfurization approach participates in incorporating sulfur atoms within the $LaCoO_3$'s crystal system; this incorporation can be on behalf of oxygen atoms by replacing oxygen by sulfur; hence, altering the lattice structure owing to the bigger size of the sulfur atom over the oxygen atom. Such modification results in polar distortions and epitaxial strain within crystal lattices, which can be accounted for by the new hexagonal phase, which is considered more distorted than the Trigonal phase. Although the introduction of sulfur may generate more distorted phases, it can also generate less distorted phases like cubic and tetragonal.

UV-vis: UV-vis spectrometer was used to analyze the optical absorption capabilities of $LaCoO_3$ and $LaCoO_nS_{3-n}$. FIG. 2*b* shows absorption edges of 450 nm for $LaCoO_nS_{3-n}$, and metallic-like absorption behaviour across the UV-vis spectroscopy spectrum for $LaCoO_3$ but with relatively much lower counts in comparison to $LaCoO_nS_{3-n}$. $LaCoO_nS_{3-n}$ shows activity in the UV region and up to −450 nm in the visible region. $LaCoO_nS_{3-n}$ exhibits enhanced light absorption in both UV and visible regions over unsulfurized $LaCoO_3$, owing to the incorporation of sulfur and its associated electronegativity resulting in a new lattice structure with a narrower band gap, and enhancing light absorption abroad visible region. In terms of analyzing absorbance after sulfurization with varying quantities, it was noted that sulfurizing a semiconductor with varying sulfur ratios increased the absorbance coefficient up to a certain point, then it decreased with the relatively higher Sulfur amount, reducing absorbance below the pure unsulfurized material, which indicates further possible light absorption enhancement of $LaCoO_nS_{3-n}$ with the higher sulfur ratio in the lattice structure.

Tauc plot and Mott-Schottky curve: To determine the band gap of $LaCoO_nS_{3-n}$, Tauc plot was employed using UV-Vis spectroscopy data of wavelength vs absorbance, constructing a new "x" vs "y" graph as hv vs (αhv)n; respectively as illustrated in FIG. 2*d*. The behaviour of $LaCoO_nS_{3-n}$ showed a clear linear region after plotting based on indirect-type semiconductors (n=0.5), revealing an estimated band gap of 2.62 eV. Further, the Mott-Schottky curve of $LaCoO_nS_{3-n}$ was plotted after running and gathering data of EIS vs potential to further determine CB and VB. The conduction band (CB) was estimated to be −0.81 eV as shown in FIG. 2*c*. Using Equation 1, the Valance band (VB) is calculated to be equal to 1.81, as $E_g$, $E_v$, and $E_c$, represent band gap, CB, and VB; respectively.

$$E_g = E_v - E_c \quad \text{Eq. 1}$$

The positive slope within the potential range of −0.5V to 0.2V indicates that $LaCoO_nS_{3-n}$ is an n-type semiconductor. Thus, the incorporation of sulfur changed p-type $LaCoO_3$ into n-type $LaCoO_nS_{3-n}$.

FTIR: FIG. 2*e* shows FTIR analysis conducted to further determine chemical bonds & groups associated with the materials, and to reveal modifications that occurred on the new sulfurized material. Metal oxygen bonds of La—O and Co—O in the $LaCoO_3$ plot are associated with peaks of the wavelength range from 570 to 677 $cm^{-1}$. $LaCoO_nS_{3-n}$ FTIR plot reveals the new sulfur oxygen bonding of both S—O and S═O bonding stretching vibrations ranging from 1024 to 1691 $cm^{-1}$.

EIS: FIG. 2*f* shows the EIS analysis conducted and plotted for $LaCoO_3$ and $LaCoOS_{3-n}$ to further understand the mechanism occurring and how sulfurization and varying composite percentages influenced the charge transfer capabilities. The sulfurization of $LaCoO_3$ to $LaCoO_nS_{3-n}$ clearly shows 660% decrease of charge impedance (−Z") when (Z') approaches $35\times10^4$ W, implying an enhanced charge transfer which is attributed to the metal-Sulfur bonds.

CV: FIG. 2*g* shows the cyclic voltammetry (CV) analysis conducted at neutral pH with curves of $LaCoO_nS_{3-n}$, obtained within the potential range of −1.8V to 1.8V. Both peaks of "oxidation 1" and "oxidation 2", respectively located at ~(−0.95V), and ~(1.09V-1.20V), are linked to the Oxygen ovulation reaction, while the "reduction 1" peak located at ~(−1.22V) is linked to the hydrogen evolution reaction. The apparent peaks imply good catalytic kinetics, good energy efficiency, and better charge transfer demonstrating a good rate of reactions due to charge generation and availability.

PL: Photoluminescence (PL) spectroscopy analysis was performed to investigate charge recombination behavior. In PL spectra, a lower intensity indicates reduced recombination and improved photocatalytic activity, and vice versa. As shown in FIG. 2*h*, $LaCoO_3$ and compound $LaCoO_nS_{3-n}$ exhibit low PL intensity despite their black appearance. While lower PL emission typically suggests reduced charge recombination, the straight-line PL profiles of $LaCoO_3$ and $LaCoO_nS_{3-n}$ indicate non-radiative recombination. This means that recombined charge carriers release energy in non-radiative forms rather than emitting detectable light, which is consistent with the observed low PL intensity.

Figure 3:
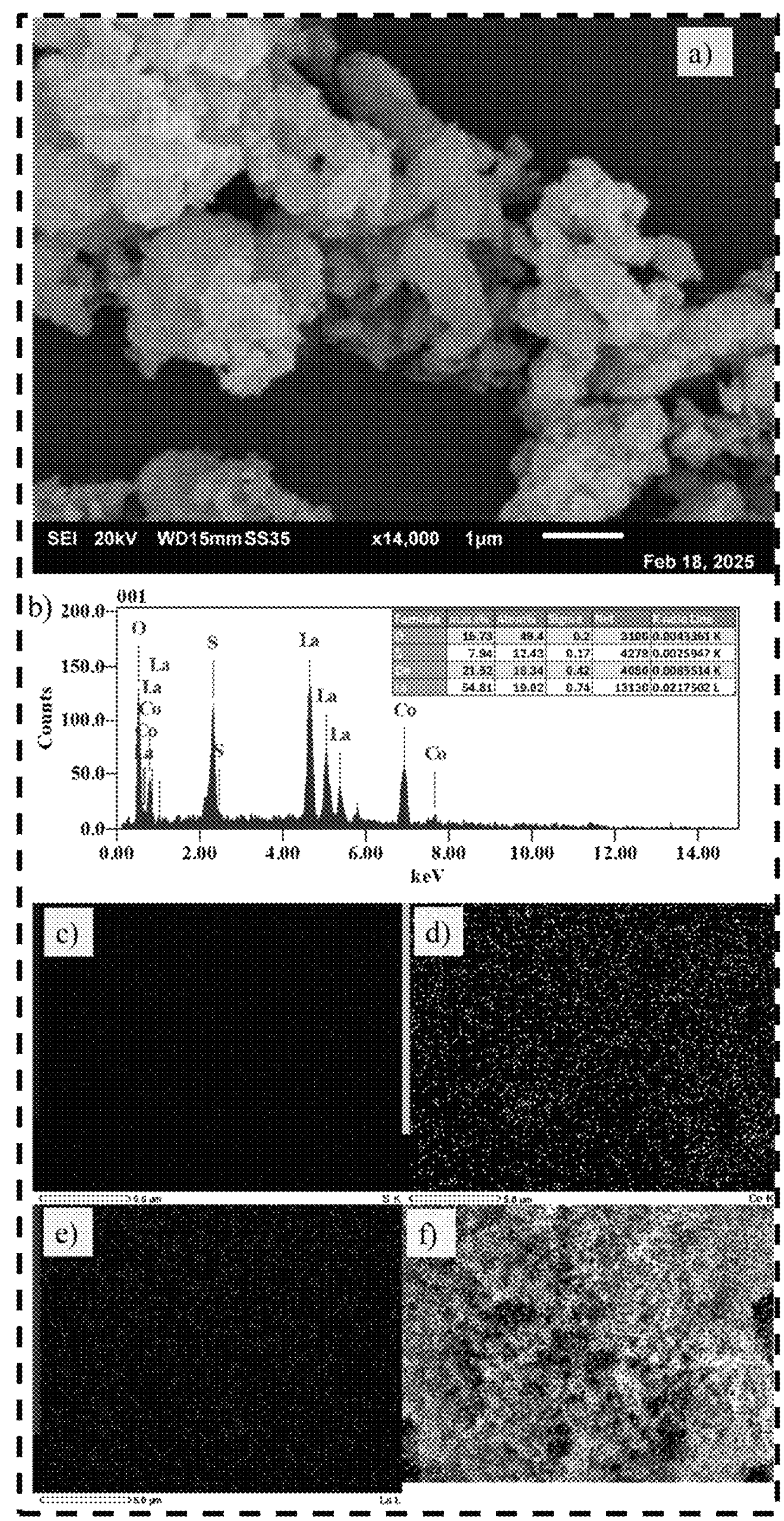
FIG. 3: illustrates a) SEM image of $LaCoO_nS_{3-n}$ nanosheets. EDX mapping. b) Mass & atomic concentrations of La, Co, O & S. c) Mapping of Sulfur. d) Mapping of Cobalt. e) Mapping of Lanthanum. f) Merging of c, d & e, in accordance with an embodiment of the present invention.

SEM & EDX: Scanning electron microscopy (SEM) was used to investigate the morphological structure $LaCoO_nS_{3-n}$. As shown in FIG. 3*a*, $LaCoO_nS_{3-n}$ exhibits an irregular sheet-like morphology, with sizes ranging from a few tens of nanometers to approximately 1 micron. These nanosheets, possessing relatively high surface area, can create numerous interfacial contact points when integrated into composite materials, thereby enhancing synergistic effects. To confirm the successful sulfurization of $LaCoO_nS_{3-n}$, EDX mapping was conducted.

The atomic concentrations as per FIG. 3*b* clearly show a very close ratio of La:Co:O:S as 2:2:5:1; respectively, further assuring the successful sulfurization method conducted, and supporting the replacement of oxygen atoms by sulfur while maintaining the general perovskite chemical formula "$ABX_3$". In addition, FIGS. 3*c*, 3*d*, 3*e*, 3*f* reveals a good degree of homogeneity and sulfurization within $LaCoO_nS_{3-n}$.

Figure 4:
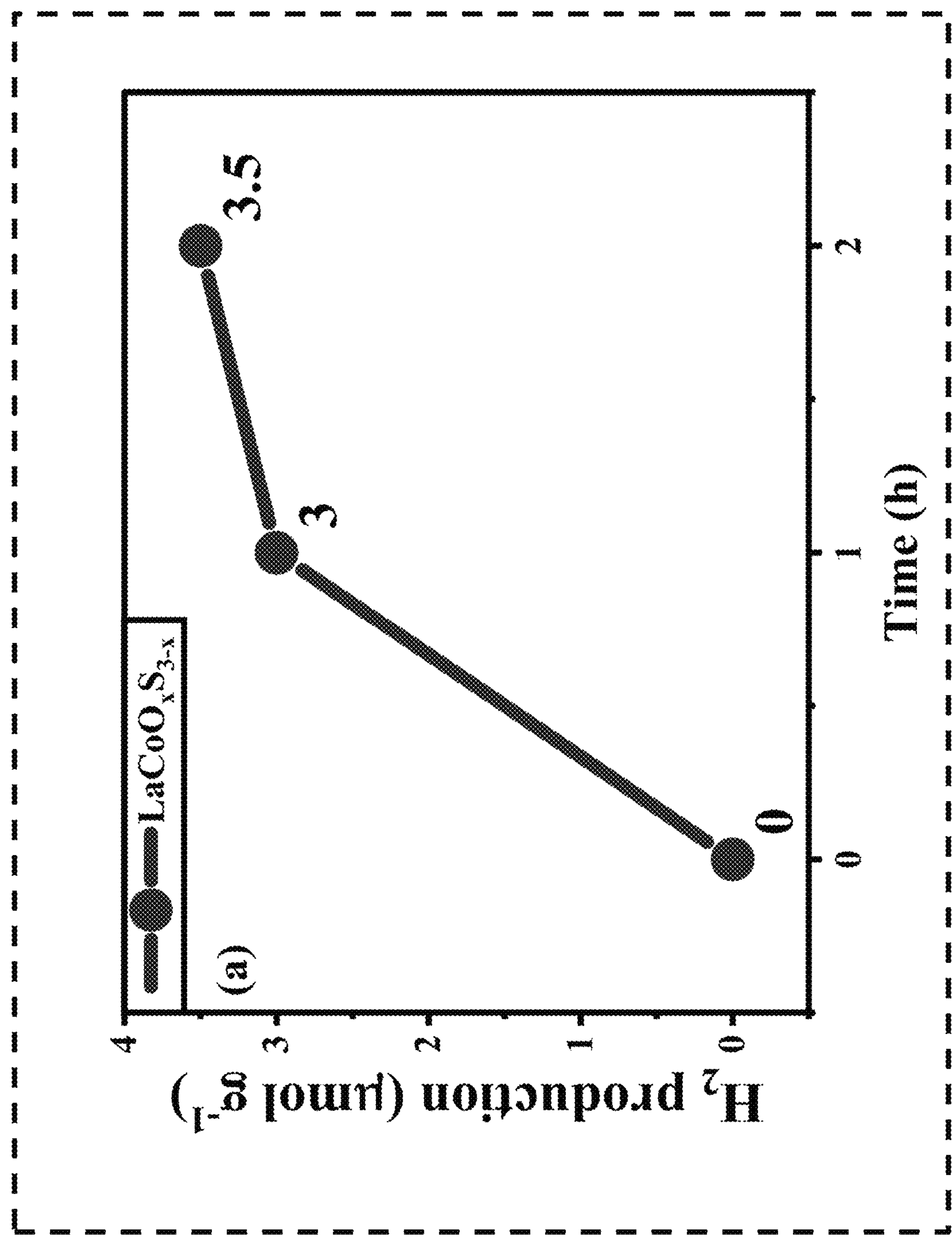
FIG. 4: illustrates photocatalytic water splitting performance of $LaCoO_nS_{3-n}$ within 2 hrs duration, in accordance with an embodiment of the present invention.

Photocatalytic water splitting performance: The photocatalytic water splitting performance of $LaCoO_nS_{3-n}$ was conducted using methanol as a sacrificial reagent. FIG. 4 shows the $H_2$ rate along with 2 hours test duration. $LaCoO_nS_{3-n}$ shows $H_2$ evolution results of 3.0 and 3.5 mmol $g^{-1}$, for the first and second hours; respectively. Hydrogen production of $LaCoO_nS_{3-n}$ is attributed to the incorporation of sulfur and elaborated by obtaining suitable BG, CB, and VB for photocatalytic water splitting, attaining good charge mobility and less resistance, good charge generation under overpotential, higher and broader light absorption in both UV and visible light regions, and high active sites provided by sulfur atoms.

Figure 5:
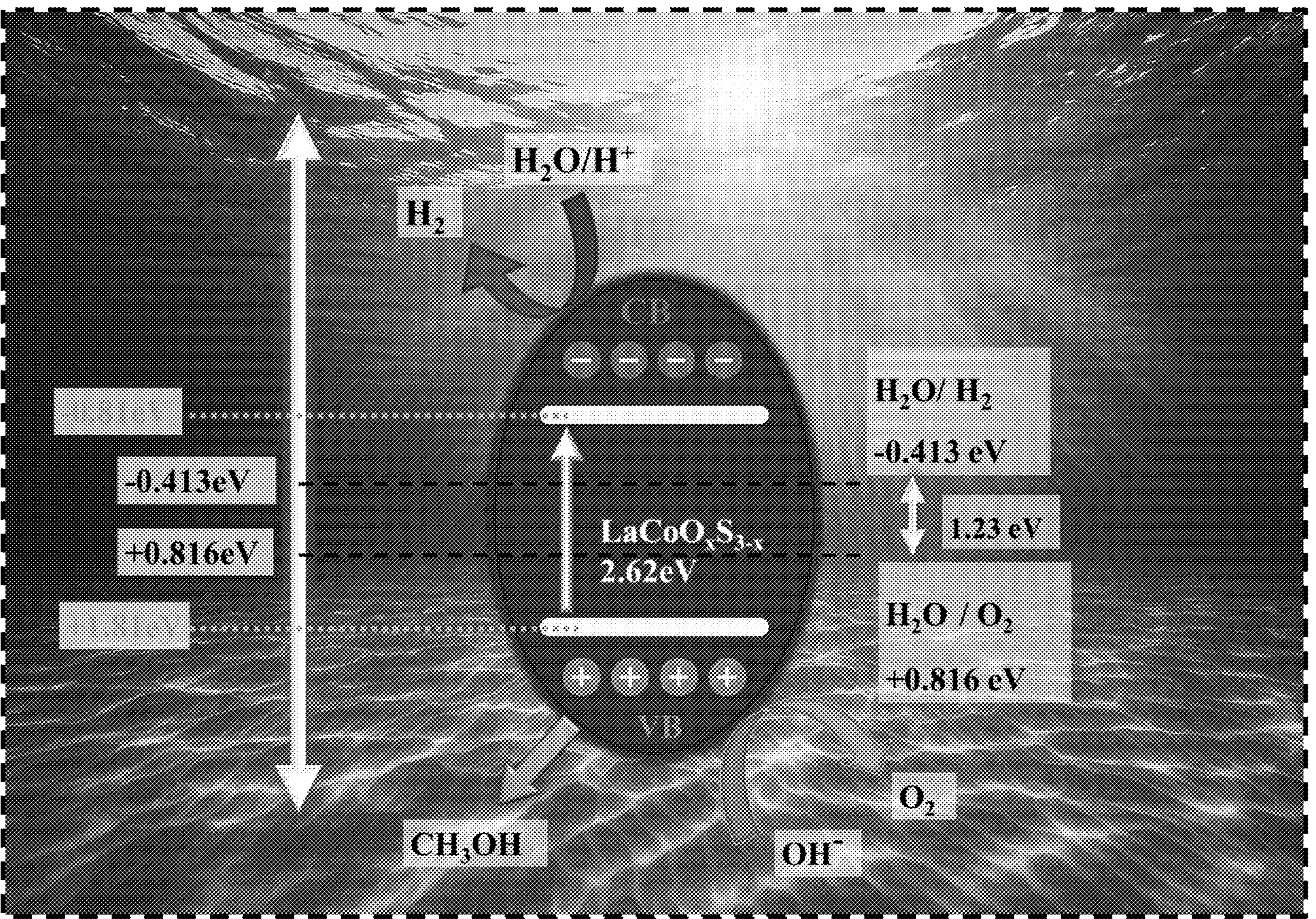
FIG. 5: illustrates photocatalytic water splitting mechanism of $LaCoO_nS_{3-n}$, in accordance with an embodiment of the present invention.

The mechanism of water splitting is demonstrated in FIG. 5. This figure illustrates the photocatalytic mechanism wherein light excites the $LaCoO_nS_{3-n}$, generating holes and electrons. These charge carriers migrate to the surface of the particles, where they interact with water molecules to drive the redox reactions involved in water splitting. Methanol ($CH_3OH$) acts as a hole scavenger, effectively reducing charge recombination by capturing photogenerated holes. This not only facilitates the oxidation of sacrificial agents but also leads to the formation of reaction intermediates. Additionally, methanol may enhance reaction selectivity by producing intermediates that maintain the desired reaction pathways without promoting side reactions:

$$H_2O_{(l)} + h^+ \rightarrow {}^\bullet OH + H^+ \quad \text{Eq. 2}$$

$$CH_3OH_{(l)} + {}^\bullet OH \rightarrow {}^\bullet CH_2OH + H_2O_{(l)} \quad \text{Eq. 3}$$

$$^\bullet CH_2OH \rightarrow HCHO_{(l)} + e^- + H^+ \quad \text{Eq. 4}$$

$$2H^+ + 2e^- \rightarrow H_{2(g)} \quad \text{Eq. 5}$$

$$HCHO_{(l)} + H_2O_{(l)} \rightarrow HCOOH_{(l)} + H_{2(g)} \quad \text{Eq. 6}$$

$$HCOOH_{(l)}CO_{2(g)} + H_{2(g)} \quad \text{Eq. 7}$$

$LaCoOS_{3-n}$ was successfully fabricated leading to high catalytic activity. The sulfurization of $LaCoO_3$ into $LaCoO_nS_{3-n}$ maintained the famous $ABX_3$ perovskite formula, while changing the lattice structure, enhancing the light absorption intensity in both UV and visible regions and shifting the absorption spectrum further towards visible light region, as well as improving charge mobility by lowering resistance. Two hours average $H_2$ yield of $LaCoO_nS_{3-n}$ is 3.25 mmol $g^{-1}h^{-1}$.

The advantages of the present invention are as follows:

The present catalytic compound does not contain expensive noble metals such as platinum, gold, silver, or ruthenium.

A small amount of the present catalytic compound, when combined with other materials, exhibits synergistic effects and can be tailored without the need for noble metals. Instead, it allows the incorporation of relatively low-cost materials, highlighting its potential for widespread industrial and commercial applications due to its flexibility and cost-effectiveness.

It facilitates both water oxidation and reduction reactions with relatively low energy input, due to its narrow band gap.

It demonstrates efficient charge transfer and high carrier mobility, attributed to the low resistance to charge movement, an advantageous property for photocatalytic applications.

It enables water splitting under visible light irradiation, leading to the generation of green hydrogen.

It supports both oxidation and reduction reactions in a neutral pH medium within a suitable potential range, due to its catalytic ability to generate a significant amount of charge carriers (holes and electrons).

It exhibits excellent photostability, maintaining catalytic performance over prolonged light exposure without significant degradation.

Its structure allows for efficient light harvesting across a broad range of the visible spectrum, enhancing overall photocatalytic efficiency.

The compound can be easily integrated with other semiconductor materials to form heterojunctions, further improving charge separation and catalytic performance.

The foregoing description of the various embodiments is provided to enable any person skilled in art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

The invention claimed is:

1. A method for manufacturing a perovskite nanosheet, wherein said method comprises the steps of:

obtaining a precursor, wherein the precursor is a compound of Formula (II):

$$LaXO_3 \quad \text{(II)}$$

wherein X is a metal selected from Fe, Co, Mn, Cu, Zn, or Ni; and synthesizing the perovskite nanosheet from the precursor using a hydrothermal sulfurization method, wherein the perovskite nanosheet comprises a compound of Formula (I):

$$LaXO_nS_{3-n} \quad \text{(I)}$$

wherein X is a metal selected from Fe, Co, Mn, Cu, Zn, or Ni; and wherein $0<n<3$.

2. The method according to claim 1, wherein obtaining the precursor comprises synthesizing the precursor using a hydrothermal synthesis method from reactants comprising a lanthanum source and a metal source, wherein the metal is selected from Fe, Co, Mn, Cu, Zn, or Ni.

3. The method according to claim 2, wherein the metal source is a cobalt source.

4. The method according to claim 2, wherein the lanthanum source comprises lanthanum nitrate hexahydrate and/or wherein the metal source comprises metal nitrate hexahydrate.

5. The method according to claim 2, wherein the hydrothermal synthesis method comprises the steps of:

mixing together a complexing agent, the lanthanum source and the metal source in water to obtain a first mixture;

preparing a strong base solution and adding it to the first mixture to obtain a second mixture; and heating, cooling and drying the second mixture, followed by calcination to obtain the precursor.

6. The method according to claim 5, wherein the complexing agent is ammonium hydroxide.

7. The method according to claim 5, wherein the strong base solution comprises sodium hydroxide or potassium hydroxide.

8. The method according to claim 5, wherein an equimolar amount of the lanthanum source and the metal source is added.

9. The method according to claim 5, wherein the heating is carried out at a temperature of 100° C. to 250° C. for 12 hours to 96 hours.

10. The method according to claim 5, wherein the calcination is carried out at a temperature of 750° C. to 950° C. for 1 hour to 6 hours.

11. The method according to claim 1, wherein the perovskite nanosheet is synthesized from reactants comprising the precursor and a sulfur source.

12. The method according to claim 11, wherein the sulfur source comprises thioacetamide (TAA).

13. The method according to claim 11, wherein the hydrothermal sulfurization method comprises the steps of:

mixing the sulfur source and the precursor to obtain a third mixture; and heating, cooling, drying the third mixture to obtain the perovskite nanosheet.

14. The method according to claim 13, wherein the molar ratio of the sulfur source and the precursor is about 0.5 to 10:0.5 to 2.

15. The method as claimed in claim 10, wherein in step (f), the second mixture is heated at a temperature of 120° C. to 180° C. for 8 hours to 16 hours.

16. The method according to claim 9, wherein the heating is carried out at a temperature of 180° C. for 48 hours.

17. The method according to claim 10, wherein the calcination is carried out at a temperature of 850° C. for 2 hours.

18. The method according to claim 14, wherein the molar ratio of the sulfur source and the precursor is about 0.5 to 3:0.5 to 1.5.

19. The method as claimed in claim 15, wherein in step (f), the second mixture is heated at a temperature of 150° C. for 12 hours.

* * * * *